A. Ward,
Excavator.
No. 87,736.      Patented Mar. 9, 1869.

Witnesses.
Wm A Morgan
G. C. Cotton

Inventor
A Ward
per Munn
Attorneys

ALBERT WARD, OF NEW MICHIGAN, ILLINOIS.

Letters Patent No. 87,736, dated March 9, 1869.

IMPROVED MACHINE FOR SCRAPING AND LOADING EARTH.

The Schedule referred to in these Letters Patent and making part of the same.

*To all whom it may concern:*

Be it known that I, ALBERT WARD, of New Michigan, in the county of Livingston, and State of Illinois, have invented new and useful Improvements in Machines for Scraping and Loading Earth into Wagons; and I do hereby declare that the following is a full, clear, and exact description thereof, which will enable others skilled in the art to make and use the same, reference being had to the accompanying drawings forming part of this specification.

The nature of my invention relates to improvements in machines for scraping earth, and loading it into wagons or carts to be carried off, whereby it is designed to provide a simple and cheap apparatus for repairing roads, or removing earth for levelling down hills, or such like purposes; and It consists in suspending scrapers from the frame of a wagon, between the front and hind wheels, by an adjustable apparatus, whereby the front ends of the said scrapers may be let into the earth at any required depth, which scrapers are provided at their rear ends with inclined chutes, up which the earth is forced and delivered to a carrier operated from the hind wheels of the wagon, transversely of the said wagon, and which projects from one side of the wagon in an elevated position, whereby the earth may be delivered to another wagon moving alongside of the said scraping-apparatus, as will be more fully described on reference to the accompanying drawings, in which—

Similar letters of reference indicate corresponding parts.

A represents the frame of a wagon supported upon four wheels, and drawn by horses in the usual manner, and which is provided with scrapers, B B, having arms *a a*, by which they are pivoted to the brackets *d*, the front parts being suspended by the chains *e* fixed to the rollers $e^1$. The said plows are also provided with chutes $a^1$, rising upward from behind the same.

Figure 1:
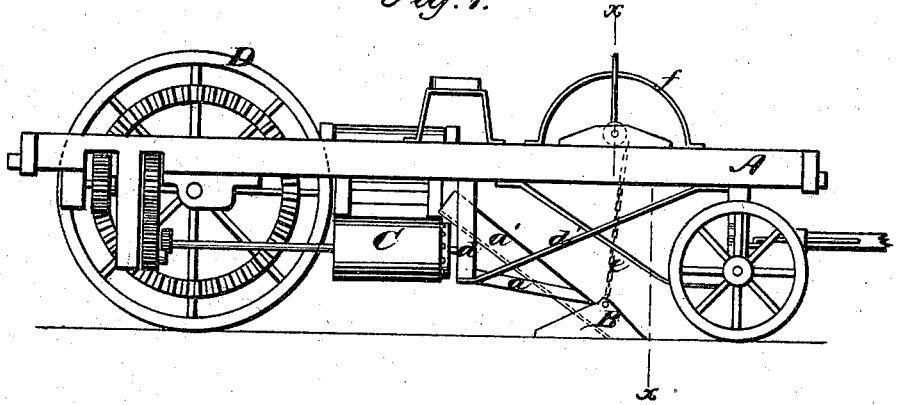
Figure 1 represents a side elevation of my improved machine.
Figure 2:
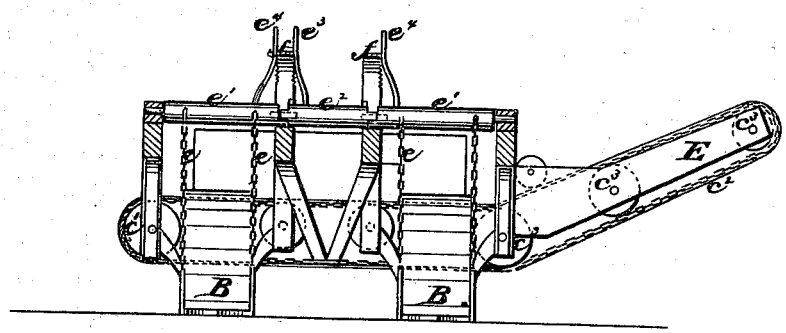
Figure 2 represents a cross-section on the line *x–x* of fig. 1.

C represents a carrier made of leather belting, rubber, or any other suitable material, which is operated by the roller $c^1$ from gear-wheels communicating with the driving-wheels D, as shown in fig. 2, and which receives the earth as it is scraped up by the scrapers, and which, by the act of scraping, is forced up the inclined chutes, and delivered on to the carrier, and which, by that, is carried up the inclined and laterally-projecting way E, to a height sufficient to be dumped into a cart or wagon driven along by the side of the scraping-machine. Chains, $c^2$, are employed to communicate motion to the other driving-rollers B, for operating the belt.

A roller, $e^2$, is introduced between the ends of the rollers $e^1$ and $e^2$, and provided with a handle, $e^3$, and so arranged, with reference to the rollers $e^1$, that when it is turned by its handle $e^3$, it will raise both the scrapers B out of the ground, or will permit either of them to be raised up or lowered by their respective handles $a^4$, independently of the other.

Ratchets, *f f*, are provided, whereby the handles of the rollers may be suspended at any desired point, to regulate the depth of cutting.

The power is communicated to the scrapers from the wagon-frame through the brackets *d* and arms *a*. The brackets are also firmly braced by the braces *d'*, and sustain the front bearings of the rollers $c^1$.

The pinion on the roller-shaft, which gears with the driving-wheel, is arranged loosely thereon, and provided with a latch-connection with the said shaft, which is designed to prevent the belt from being actuated in a backward direction when the machine is turning around or being moved backward.

I claim as new, and desire to secure by Letters Patent—

1. The arrangement of the independent scrapers B B, each carrying an inclined trough, $a^1$, and connected by the bars *a* to the brackets *d*, one of which furnishes the forward bearing for the shaft operating the endless carrier C, all operating as described for the purpose specified.

2. The arrangement of the rollers $e^1$ $e^2$ and chains *e*, with reference to the scrapers B B, whereby said scrapers are operated together, or independently of each other, as herein shown and described.

3. The arrangement, upon the wagon, of the rollers $e^1$ $e^2$, supporting the scrapers B by the chains *e*, the bars *a*, inclined troughs $a^1$, bracket *d*, endless carrier C, and the gearing by which the latter is operated, as herein set forth and shown.

ALBERT WARD.

Witnesses:
EDMUND SHEIBLEY,
ANDREW I. SONGER.